United States Patent
Wang et al.

(10) Patent No.: US 11,350,439 B2
(45) Date of Patent: May 31, 2022

(54) USER-EQUIPMENT-COORDINATION-SET CONTROL AGGREGATION

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/969,539

(22) PCT Filed: Aug. 13, 2019

(86) PCT No.: PCT/US2019/046374
§ 371 (c)(1),
(2) Date: Aug. 12, 2020

(87) PCT Pub. No.: WO2021/029879
PCT Pub. Date: Feb. 18, 2021

(65) Prior Publication Data
US 2021/0345381 A1    Nov. 4, 2021

(51) Int. Cl.
*H04W 72/12*   (2009.01)
*H04W 80/02*   (2009.01)
(Continued)

(52) U.S. Cl.
CPC ....... *H04W 72/1284* (2013.01); *H04L 27/364* (2013.01); *H04W 52/365* (2013.01); *H04W 56/005* (2013.01); *H04W 80/02* (2013.01)

(58) Field of Classification Search
CPC ........... H04W 72/0473; H04W 72/121; H04W 72/1284; H04W 80/02; H04W 52/365; H04W 76/15; H04L 27/364
See application file for complete search history.

(56) References Cited

U.S. PATENT DOCUMENTS 6,665,521 B1    12/2003 Gorday et al.
6,898,430 B1    5/2005 Liberti et al.
(Continued)

FOREIGN PATENT DOCUMENTS

CN    101764634    6/2010
CN    101867451    10/2010
(Continued)

OTHER PUBLICATIONS

"3GPP TS 24.501 V16.3.0", 3GPP TS 24.501 version 16.3.0, Dec. 2019, 645 pages.
(Continued)

*Primary Examiner* — Mohamed A Kamara
(74) *Attorney, Agent, or Firm* — Colby Nipper PLLC

(57) ABSTRACT

This document describes methods, devices, systems, and means for user-equipment-coordination-set (404) control aggregation that facilitates more efficient control-plane signaling in comparison to conventional wireless communication systems. Overhead for control-plane signaling is reduced by communicating reports and control commands for the multiple user equipments (110) in the user-equipment-coordination-set (404) in a single message instead of communicating a single control message for each user equipment (110). Additionally, the user-equipment-coordination-set (404) uses joint-reception and joint-transmission, to increase the reliability of communicating reports and control commands, especially in the case of challenging radio communication conditions between a base station (121) and an individual UE (110) located near the edge of a cell provided by the vase station.

20 Claims, 8 Drawing Sheets

(51) Int. Cl.
*H04L 27/36* (2006.01)
*H04W 52/36* (2009.01)
*H04W 56/00* (2009.01)

(56) References Cited

U.S. PATENT DOCUMENTS

| | | | |
|---|---|---|---|
| 9,210,550 | B2 | 12/2015 | Koc et al. |
| 9,253,783 | B2 | 2/2016 | Wang et al. |
| 9,344,159 | B2 | 5/2016 | Zhuang |
| 9,780,842 | B2 | 10/2017 | Boudreau et al. |
| 9,941,939 | B2 | 4/2018 | Parl et al. |
| 9,985,750 | B2 | 5/2018 | Maaref et al. |
| 10,045,376 | B2 | 8/2018 | Yang et al. |
| 10,178,696 | B2 | 1/2019 | Cheng et al. |
| 10,201,003 | B2 | 2/2019 | Guo et al. |
| 10,218,422 | B2 | 2/2019 | Raghavan et al. |
| 10,412,691 | B1 | 9/2019 | Marupaduga et al. |
| 10,893,572 | B2 | 1/2021 | Wang et al. |
| 2004/0203973 | A1 | 10/2004 | Khan |
| 2004/0233858 | A1 | 11/2004 | Karaoguz |
| 2007/0223423 | A1 | 9/2007 | Kim et al. |
| 2010/0027487 | A1 | 2/2010 | Ihm et al. |
| 2010/0103983 | A1 | 4/2010 | Wang et al. |
| 2010/0297993 | A1* | 11/2010 | Heo ................. H04W 76/10 455/423 |
| 2011/0124294 | A1 | 5/2011 | Dwyer et al. |
| 2011/0158117 | A1 | 6/2011 | Ho et al. |
| 2012/0102409 | A1 | 4/2012 | Fan et al. |
| 2012/0120821 | A1 | 5/2012 | Kazmi et al. |
| 2012/0157139 | A1 | 6/2012 | Noh et al. |
| 2012/0236735 | A1 | 9/2012 | Nory et al. |
| 2012/0264443 | A1 | 10/2012 | Ng et al. |
| 2013/0034136 | A1 | 2/2013 | Park et al. |
| 2013/0041954 | A1 | 2/2013 | Kim et al. |
| 2013/0107848 | A1 | 5/2013 | Kang et al. |
| 2013/0130684 | A1 | 5/2013 | Gomes et al. |
| 2013/0138817 | A1 | 5/2013 | Zhang et al. |
| 2013/0150106 | A1 | 6/2013 | Bucknell et al. |
| 2013/0182628 | A1 | 7/2013 | Gholmieh et al. |
| 2013/0225184 | A1 | 8/2013 | Liu et al. |
| 2013/0329711 | A1 | 12/2013 | Seo et al. |
| 2014/0010131 | A1 | 1/2014 | Gaal et al. |
| 2014/0029591 | A1 | 1/2014 | Anderson |
| 2014/0127991 | A1 | 5/2014 | Lim et al. |
| 2014/0148168 | A1 | 5/2014 | Aoyagi et al. |
| 2014/0169261 | A1 | 6/2014 | Ming et al. |
| 2014/0226575 | A1 | 8/2014 | Davydov et al. |
| 2014/0274081 | A1 | 9/2014 | Comeau et al. |
| 2014/0321433 | A1 | 10/2014 | Xiao et al. |
| 2015/0043390 | A1 | 2/2015 | Wang et al. |
| 2015/0098397 | A1 | 4/2015 | Anovic et al. |
| 2015/0110040 | A1 | 4/2015 | Zhao |
| 2015/0139197 | A1 | 5/2015 | He et al. |
| 2015/0139203 | A1 | 5/2015 | Miryala et al. |
| 2015/0163822 | A1 | 6/2015 | Guo et al. |
| 2015/0195795 | A1 | 7/2015 | Loehr et al. |
| 2015/0288427 | A1 | 10/2015 | Wang et al. |
| 2015/0358860 | A1 | 12/2015 | Lu et al. |
| 2015/0373730 | A1 | 12/2015 | Fujishiro et al. |
| 2015/0382142 | A1 | 12/2015 | Kim et al. |
| 2016/0007138 | A1 | 1/2016 | Palanisamy et al. |
| 2016/0021526 | A1 | 1/2016 | Niu et al. |
| 2016/0044634 | A1 | 2/2016 | Seo et al. |
| 2016/0057604 | A1 | 2/2016 | Luo et al. |
| 2016/0128123 | A1 | 5/2016 | Li |
| 2016/0174278 | A1 | 6/2016 | Gao et al. |
| 2016/0192420 | A1 | 6/2016 | Kim et al. |
| 2016/0192433 | A1 | 6/2016 | Deenoo et al. |
| 2016/0227463 | A1 | 8/2016 | Baligh et al. |
| 2016/0323832 | A1 | 11/2016 | Love et al. |
| 2017/0070931 | A1 | 3/2017 | Huang et al. |
| 2017/0078333 | A1 | 3/2017 | Tevlin |
| 2017/0086061 | A1 | 3/2017 | Huang et al. |
| 2017/0188206 | A1 | 6/2017 | Schmitt et al. |
| 2017/0188406 | A1 | 6/2017 | Baligh et al. |
| 2017/0230986 | A1 | 8/2017 | Moon et al. |
| 2017/0265227 | A1* | 9/2017 | Wang .................. H04W 72/04 |
| 2017/0332389 | A1 | 11/2017 | Sun et al. |
| 2017/0339530 | A1 | 11/2017 | Maaref |
| 2017/0359759 | A1 | 12/2017 | Brown et al. |
| 2018/0020444 | A1 | 1/2018 | Lee et al. |
| 2018/0027393 | A1 | 1/2018 | Yang et al. |
| 2018/0115932 | A1 | 4/2018 | Gomes et al. |
| 2018/0145805 | A1 | 5/2018 | Maaref |
| 2018/0146471 | A1 | 5/2018 | Xu et al. |
| 2018/0184386 | A1 | 6/2018 | Heo et al. |
| 2018/0235020 | A1 | 8/2018 | Maaref |
| 2018/0317130 | A1 | 11/2018 | Jin et al. |
| 2018/0352511 | A1 | 12/2018 | Martin et al. |
| 2019/0037560 | A1* | 1/2019 | Huang ............... H04W 52/365 |
| 2019/0075604 | A1 | 3/2019 | Wang et al. |
| 2019/0081657 | A1 | 3/2019 | Zeng et al. |
| 2019/0174346 | A1 | 6/2019 | Murray et al. |
| 2019/0174472 | A1 | 6/2019 | Lee et al. |
| 2019/0208539 | A1 | 7/2019 | Christoffersson et al. |
| 2019/0261443 | A1 | 8/2019 | Baligh et al. |
| 2019/0312616 | A1 | 10/2019 | Christoffersson et al. |
| 2020/0092685 | A1* | 3/2020 | Fehrenbach ......... H04B 7/2606 |
| 2020/0120649 | A1 | 4/2020 | Nimbalker et al. |
| 2020/0137754 | A1* | 4/2020 | Kim ................. H04W 28/0278 |
| 2020/0154442 | A1 | 5/2020 | Zhou |
| 2020/0374970 | A1 | 11/2020 | Wang et al. |
| 2021/0029516 | A1 | 1/2021 | Wang et al. |
| 2021/0345358 | A1 | 11/2021 | Wang et al. |
| 2021/0385903 | A1 | 12/2021 | Wang et al. |
| 2022/0006493 | A1 | 1/2022 | Wang et al. |
| 2022/0086653 | A1 | 3/2022 | Wang et al. |

FOREIGN PATENT DOCUMENTS

| | | |
|---|---|---|
| CN | 104429142 | 3/2015 |
| EP | 2953393 | 12/2015 |
| EP | 3425936 | 1/2019 |
| GB | 2562109 | 11/2018 |
| WO | 0237771 | 5/2002 |
| WO | 2008147654 | 12/2008 |
| WO | 2013091229 | 6/2013 |
| WO | 2014179958 | 11/2014 |
| WO | 2015074270 | 5/2015 |
| WO | 2015163798 | 10/2015 |
| WO | 2016081375 | 5/2016 |
| WO | 2017148173 | 9/2017 |
| WO | 2018010818 | 1/2018 |
| WO | 2018020015 | 2/2018 |
| WO | 2018031770 | 2/2018 |
| WO | 2018130115 | 7/2018 |
| WO | 2018192699 | 10/2018 |
| WO | 2018202797 | 11/2018 |
| WO | 2018202798 | 11/2018 |
| WO | 2019016141 | 1/2019 |
| WO | 2020113010 | 6/2020 |
| WO | 2020139811 | 7/2020 |
| WO | 2020172022 | 8/2020 |
| WO | 2021054964 | 3/2021 |

OTHER PUBLICATIONS

"3rd Generation Partnership Project; Technical Specification Group Services and System Aspects; Security architecture and procedures for 5G system", 3GPP TS 33.501 version 16.1.0 Release 16, Dec. 2019, 202 pages.

"5G; Non-Access-Stratum (NAS) protocol for 5G System (5GS); Stage 3", 3GPP TS 24.501 version 15.1.0 Release 15, Oct. 2018, 406 pages.

"Discussion on NR Beamforming with UE-Group-Specific Beam Sweeping", 3GPP TSG-RAN WG1 Meeting #86 R1-166219; Gothenburg, Sweden, Aug. 22-26, 2016, 7 pages.

"International Search Report and Written Opinion", PCT Application No. PCT/US2019/043355, dated Mar. 31, 20, 12 pages.

"International Search Report and Written Opinion", PCT Application No. PCT/US2019/063620, dated Mar. 9, 2020, 14 pages.

(56) References Cited

OTHER PUBLICATIONS

"International Search Report and Written Opinion", PCT Application No. PCT/US2019/046374, dated Apr. 14, 20, 13 pages.
"International Search Report and Written Opinion", PCT Application No. PCT/US2019/068265, dated Apr. 29, 20, 29 pages.
"International Search Report and Written Opinion", PCT Application No. PCT/US2019/052005, dated May 18, 2020, 14 pages.
"International Search Report and Written Opinion", PCT Application No. PCT/US2020/022460, dated May 26, 2020, 13 pages.
"International Search Report and Written Opinion", PCT Application No. PCT/US2020/017930, dated May 29, 2020, 14 pages.
"Invitation to Pay Additional Fees", PCT Application No. PCT/US2019/068265, dated Mar. 13, 20, 13 pages.
"LTE; Evolved Universal Terrestrial Radio Access (E-UTRA); Medium Access Control (MAC) protocol specification (3GPP TS 36.321 version 15.8.0 Release 15)", ETSI TS 136 321 V15.8.0 (Jan. 2020), Jan. 2020, 137 pages.
"Non-Final Office Action", U.S. Appl. No. 16/419,854, filed Jun. 30, 2020, 29 Pages.
"Third Generation Partnership Project; Technical Specification Group Services and System Aspects; Service requirements for the 5G system; Stage 1", 3GPP TS 22 261 version 16.10.0 Release 16, Dec. 2019, 72 pages.
"U.S. Appl. No. 62/785,949", filed Feb. 21, 2019.
"U.S. Appl. No. 62/785,949", filed Dec. 28, 2018.
"UE Overheating for EN-DC", 3GPP R2-1802414, UE overheating for EN-DC, in 3GPP TSG-RAN WG2 Meeting #101, Apple Inc., Mar. 2, 2018, 3 pages.
Aboba, et al., "Extensible Authentication Protocol (EAP)", RFC Editor; Retrieved from https://www.rfc-editor.org/info/rfc3748, Jun. 2004, 67 pages.
Klingenbrunn, et al., "Power Backoff Mechanism for Intermodulation Distortion and Harmonic Distortion", Technical Disclosure Commons; Retrieved from https://www.tdcommons.org/dpubs_series/3424, Jul. 13, 2020, 13 pages.
Lin, et al., "Handling of Extensible Authentication Protocol Based Non-Access Stratum Authentication Failures", Technical Disclosure Commons; Retrieved from https://www.tdcommons.org/dpubs_series/3191, Apr. 23, 2020, 11 pages.
Son, "7 Deployment Scenarios of Private 5G Networks", Netmanias; Retrieved from https://www.netmanias.com/en/post/blog/14500/5g-edge-kt-sk-telecom/7-deployment-scenarios-of-private-5g-networks, Oct. 21, 2019, 11 pages.
Wu, "Handling Overheating in a Wireless-Communication Device", Technical Disclosure Commons; Retrieved from https://www.tdcommons.org/dpubs_series/2343, Jul. 12, 2019, 22 pages.
Zhang, et al., "Grant-less Uplink Transmission for LTE Operated in Unlicensed Spectrum", Feb. 14, 2018, 6 pages.
"Notice of Allowance", U.S. Appl. No. 16/419,854, dated Nov. 5, 2020, 11 pages.
"Written Opinion", Application No. PCT/US2019/068265, dated Sep. 25, 2020, 20 pages.
"International Preliminary Report on Patentability", Application No. PCT/US2019/063620, dated May 25, 2021, 8 pages.
"Corrected Notice of Allowance", U.S. Appl. No. 16/419,854, dated Dec. 16, 2020, 2 pages.
"International Preliminary Report on Patentability", Application No. PCT/US2019/068265, dated Jan. 18, 2021, 33 pages.
"International Preliminary Report on Patentability", Application No. PCT/US2020/017930, dated Aug. 10, 2021, 9 pages.
"Evolved Universal Terrestrial Radio Access (E-UTRA)—Medium Access Control (MAC) Protocol Specification", 3GPP TS 36.321 Version 12.5. Release 12, Apr. 2015, 79 pages.
Tavanpour, "Upload User Collaboration in the Data Upload for LTE-Advanced Networks", Carleton University, Ottawa, Ontario, Jan. 2016, 199 pages.
"Foreign Office Action", TW Application No. 20209124827, 13 pages dated Sep. 17, 2021.
"Foreign Office Action", EP Application No. 19756050.1, dated Jan. 24, 2022, 4 pages.
"Foreign Office Action", KR Application No. 10-2020-7022366, dated Feb. 23, 2022, 11 pages.
"International Preliminary Report on Patentability", Application No. PCT/US2019/043355, dated Jan. 25, 2022, 7 pages.
"International Preliminary Report on Patentability", Application No. PCT/US2019/046374, dated Feb. 8, 2022, 8 pages.
"Non-Final Office Action", U.S. Appl. No. 16/963,623, dated Jan. 5, 2022, 12 pages.
"Notice of Allowance", U.S. Appl. No. 16/969,105, dated Feb. 7, 2022, 7 pages.
"Foreign Office Action", IN Application No. 202147025618, dated Mar. 11, 2022, 5 pages.
"International Preliminary Report on Patentability", Application No. PCT/US2019/052005, dated Mar. 31, 2022, 8 pages.

\* cited by examiner

USER-EQUIPMENT-COORDINATION-SET CONTROL AGGREGATION

BACKGROUND

Generally, a provider of a wireless network manages wireless communications over the wireless network. For example, a base station manages a wireless connection with a user equipment (UE) that is connected to the wireless network. The base station determines configurations for the wireless connection, such as bandwidth, timing, and protocol for the wireless connection.

The quality of service between the UE and the base station can be degraded by a number of factors, such as loss in signal strength, bandwidth limitations, interfering signals, and so forth. This is particularly true for UEs operating at a cell edge, which is frequently troubled by weak signal quality. A number of solutions have been developed to address cell-edge issues occurring in certain wireless communication systems. However, techniques to improve cell-edge issues lack capabilities to efficiently manage control signaling for user equipments experiencing weak signal quality.

SUMMARY

This summary is provided to introduce simplified concepts of user-equipment-coordination-set control aggregation. The simplified concepts are further described below in the Detailed Description. This summary is not intended to identify essential features of the claimed subject matter nor is it intended for use in determining the scope of the claimed subject matter.

In aspects, methods, devices, systems, and means for report consolidation for a user-equipment-coordination set by a user equipment configured as a coordinating user equipment are described in which the coordinating user equipment receives, from each of multiple user equipments in the user-equipment-coordination set, a respective report message. The coordinating user equipment consolidates the received report messages and a report value of the coordinating user equipment to generate a consolidated report message and transmits the consolidated report message to a base station, directing the base station to evaluate resource allocations for the user-equipment-coordination set based on the consolidated report message. In one embodiment the method further comprises jointly transmitting the consolidated report message to the base station via the multiple user equipments of the user-equipment-coordination set, wherein the joint transmission may be triggered by the coordinating user equipment after having generated the consolidated report message.

In further aspects, methods, devices, systems, and means for command aggregation for a user-equipment-coordination set by a user equipment configured as a coordinating user equipment are described in which the coordinating user equipment receives a downlink transmission of an aggregated-command message from a base station. The coordinating user equipment demodulates and samples the received downlink transmission to produce a first set of I/Q samples corresponding to the aggregated-command message. The coordinating user equipment receives, from each of multiple user equipments in the user-equipment-coordination, a respective additional set of I/Q samples corresponding to the aggregated-command message. The coordinating user equipment processes the first set of I/Q samples and the additional sets of I/Q samples to decode the aggregated-command message and disaggregates the decoded aggregated-command message to extract commands for individual user equipments. The coordinating user equipment generates user-equipment-specific command messages for each user equipment in the user-equipment-coordination set, each user-equipment-specific command message directing the respective user equipment to apply a setting to the user equipment based on the user-equipment specific message.

BRIEF DESCRIPTION OF THE DRAWINGS

The details of one or more aspects of user-equipment-coordination-set control aggregation are described below. The use of the same reference numbers in different instances in the description and the figures indicate similar elements.

DETAILED DESCRIPTION

Figure 1:
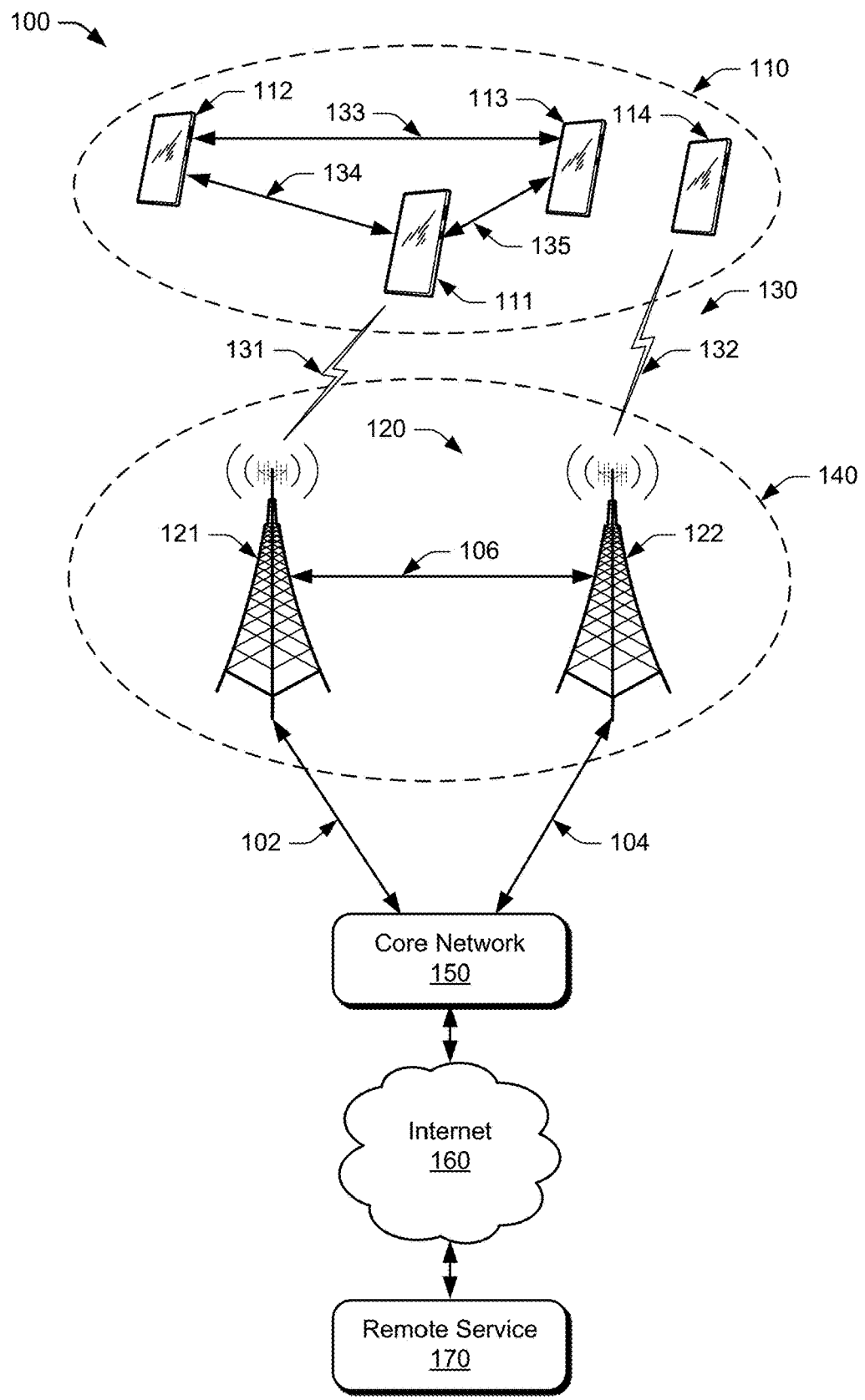
FIG. 1 illustrates an example operating environment in which aspects of user-equipment-coordination-set control aggregation can be implemented.

This document describes techniques and apparatuses for user-equipment-coordination-set (UECS) control aggregation that facilitates more efficient control-plane signaling in comparison to conventional wireless communication systems. Overhead for control-plane signaling is reduced by communicating reports and control commands for the multiple user equipment (UE) in a UECS in a single message instead of communicating a single control message for each UE. Additionally, the UECS uses joint-reception and joint-transmission to increase the reliability of communicating reports and control commands, especially in the case of challenging radio communication conditions between a base station and an individual UE, such as a UE located near the edge of a cell provided by the base station.

A UE-coordination set is formed by multiple UEs assigned as a group to function together, similarly to a distributed antenna, for the benefit of a particular UE. The UE-coordination set includes a coordinating UE that coordinates joint transmission and reception of downlink and/or uplink data for the particular UE (e.g., target UE) or multiple UEs in the UE-coordination set. By combining antennas and transmitters of multiple UEs in the UE-coordination set, the effective transmit power of the particular UE is significantly increased, and the effective signal quality is greatly improved.

Multiple UEs can each receive downlink data transmissions from the base station. Unlike conventional relay techniques, these UEs do not decode the downlink transmissions into data packets and then forward the data packets to a destination. Rather, the UEs demodulate and sample the downlink transmissions to produce I/Q samples. The UEs determine where to forward the I/Q samples of the downlink transmissions, such as to a coordinating UE or a target UE for decoding. In aspects, the target UE may be included in a subset of target UEs within the UE-coordination set. The coordinating UE (or the target UE) receives the I/Q samples from the other UEs in the UE-coordination set and stores the I/Q samples in a buffer memory for decoding. Then, the coordinating UE (or the target UE) synchronizes and decodes the stored I/Q samples into data packets for the target UE(s). Accordingly, the processing of the I/Q samples occurs at the coordinating UE or the target UE. In this way, the UE-coordination set acts as a distributed antenna for the target UE. The target UE includes its own antenna(s) and participates in the reception, demodulation, and sampling of downlink transmissions from the base stations, and forwards the sampled I/Q data to the coordinating UE. However, if the target UE is the coordinating UE, then the target UE does not forward the I/Q samples to itself.

In one use case, multiple UEs can form a UE-coordination set to transmit a message to a base station at a higher effective transmit power than would be possible for an individual UE. Additionally, those UEs can form a UE-coordination set to receive a message from the base station for one of the UEs with greater, effective receive sensitivity than would be possible for an individual UE. One of the multiple UEs acts as a coordinating UE for the UE-coordination set to aggregate data signals intended for a target UE and received by the UE-coordination set. Each of the UEs demodulates and samples the radio frequency signals and forwards the baseband samples to the coordinating UE using a local wireless network. Then, the coordinating UE aggregates and processes the samples to generate decoded data and provides the decoded data to the target UE. Alternatively, the coordinating UE can forward the stored samples to the target UE to allow the target UE to decode the data.

In aspects, the coordinating UE of a UECS receive reports from individual UEs in the UECS. The coordinating UE consolidates the individual UE reports into a consolidated report for the UECS. The coordinating UE schedules joint transmission of the consolidated report and distributes I/Q samples for the joint transmission to the UEs in the UECS. The UEs in the UECS then jointly transmit the consolidated report to a base station. By using joint-transmission of a consolidated report, the overhead of reporting, as compared to individual reports for each UE, is reduced, improving network efficiency, and reducing the user of air interface resources. Joint-transmission of the consolidated report also increases the effective transmission power to improve uplink communication reliability for delivery of the report.

In further aspects, the report can be the report of one or more Medium Access Control (MAC) layer Control Element (CE) values. For example, the consolidated report can include a consolidated Buffer Status Report (BSR) that includes the buffer size value for each of the UEs in the UECS. In another example, the consolidated report can include a consolidated Power Headroom Report (PHR) that includes the transmit power headroom value for each of the UEs in the UECS.

In other aspects, the base station transmits an aggregated-command message that includes an aggregation of commands for the individual UEs in the UECS. The UEs in the UECS receive a downlink transmission of the aggregated-command message, demodulate and sample the received transmission, and forward I/Q samples corresponding to the received aggregated-command message to the coordinating UE of the UECS. The coordinating UE processes the received I/Q samples to decode the aggregated-command message from the base station. The coordinating UE disaggregates the commands included in the aggregated-command message and forwards user-specific commands to the respective UEs over a local wireless network between the UEs in the UECS.

In further aspects, the command messages in the aggregated-command message can be one or more MAC layer commands. For example, the aggregated-command message can include timing advance (TA) commands for each of the UEs in the UECS. In another example, the aggregated-command message can include transmit power control (TPC) commands for each of the UEs in the UECS.

Example Environments

FIG. 1 illustrates an example environment 100, which includes multiple user equipment 110 (UE 110), illustrated as UE 111, UE 112, UE 113, and UE 114. Each UE 110 can communicate with one or more base stations 120 (illustrated as base stations 121 and 122) through one or more wireless communication links 130 (wireless link 130), illustrated as wireless links 131 and 132. Each UE 110 in a UE-coordination set (illustrated as UE 111, UE 112, and UE 113) can communicate with a coordinating UE of the UE-coordination set and/or a target UE in the UE-coordination set through one or more local wireless network connections (e.g., WLAN, Bluetooth, NFC, a personal area network (PAN), WiFi-Direct, IEEE 802.15.4, ZigBee, Thread, millimeter wavelength communication (mmWave), or the like) such as local wireless network connections 133, 134, and 135. Although illustrated as a smartphone, the UE 110 may be implemented as any suitable computing or electronic device, such as a mobile communication device, a modem, cellular phone, gaming device, navigation device, media device, laptop computer, desktop computer, tablet computer, smart appliance, vehicle-based communication system, an Internet-of-things (IoT) device (e.g., sensor node, controller/actuator node, combination thereof), and the like. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, or the like, or any combination thereof.

The base stations 120 communicate with the user equipment 110 using the wireless links 131 and 132, which may be implemented as any suitable type of wireless link. The wireless links 131 and 132 include control and data communication, such as downlink of data and control information communicated from the base stations 120 to the user equipment 110, uplink of other data and control information communicated from the user equipment 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

The base stations 120 are collectively a Radio Access Network 140 (e.g., RAN, Evolved Universal Terrestrial Radio Access Network, E-UTRAN, 5G NR RAN, or NR RAN). The base stations 121 and 122 in the RAN 140 are connected to a core network 150. The base stations 121 and 122 connect, at 102 and 104 respectively, to the core network 150 through an NG2 interface for control-plane signaling and using an NG3 interface for user-plane data communications when connecting to a 5G core network, or using an Si interface for control-plane signaling and user-plane data communications when connecting to an Evolved Packet Core (EPC) network. The base stations 121 and 122 can communicate using an Xn Application Protocol (XnAP) through an Xn interface or using an X2 Application Protocol (X2AP) through an X2 interface, at 106, to exchange user-plane and control-plane data. The user equipment 110 may connect, via the core network 150, to public networks, such as the Internet 160 to interact with a remote service 170.

Example Devices

Figure 2:
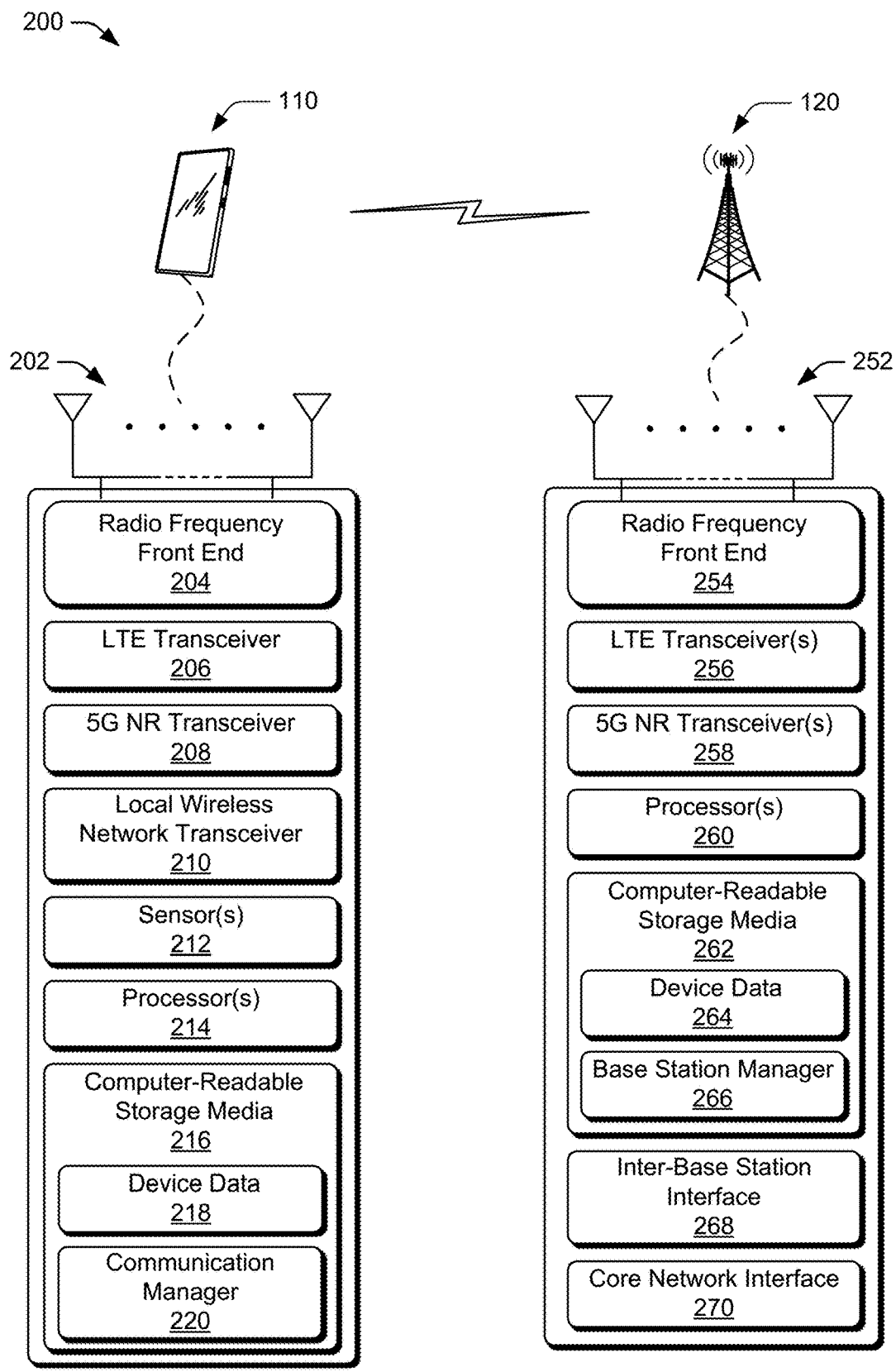
FIG. 2 illustrates an example device diagram of a user equipment and a serving cell base station.

FIG. 2 illustrates an example device diagram 200 of a user equipment and a base station. In aspects, the device diagram 200 describes devices that can implement various aspects of UE-coordination-set control aggregation. Included in FIG. 2 are the multiple UE 110 and the base stations 120. The multiple UE 110 and the base stations 120 may include additional functions and interfaces that are omitted from FIG. 2 for the sake of clarity. The UE 110 includes antennas 202, a radio frequency front end 204 (RF front end 204), and radio-frequency transceivers (e.g., an LTE transceiver 206 and a 5G NR transceiver 208) for communicating with base stations 120 in the 5G RAN 141 and/or the E-UTRAN 142. The UE 110 includes one or more additional transceivers (e.g., local wireless network transceiver 210) for communicating over one or more wireless local wireless networks (e.g., WLAN, Bluetooth, NFC, a personal area network (PAN), WiFi-Direct, IEEE 802.15.4, ZigBee, Thread, mmWave, or the like) with at least the coordinating UE, and/or the target UE, of the UE-coordination set. The RF front end 204 of the UE 110 can couple or connect the LTE transceiver 206, the 5G NR transceiver 208, and the local wireless network transceiver 210 to the antennas 202 to facilitate various types of wireless communication.

The antennas 202 of the UE 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base stations 120. By way of example and not limitation, the antennas 202 and the RF front end 204 can be implemented for operation in sub-gigahertz bands, sub-6 GHz bands, and/or above 6 GHz bands that are defined by the 3GPP LTE and 5G NR communication standards. In addition, the RF front end 204 can be tuned to, and/or be tunable to, one or more frequency bands defined and implemented by the local wireless network transceiver 210 to support transmission and reception of communications with other UEs in the UE-coordination set over a local wireless network.

The UE 110 includes sensor(s) 212 can be implemented to detect various properties such as temperature, supplied power, power usage, battery state, or the like. As such, the sensors 212 may include any one or a combination of temperature sensors, thermistors, battery sensors, and power usage sensors.

The UE 110 also includes processor(s) 214 and computer-readable storage media 216 (CRM 216). The processor 214 may be a single core processor or a multiple core processor composed of a variety of materials, such as silicon, polysilicon, high-K dielectric, copper, and so on. The computer-readable storage media described herein excludes propagating signals. CRM 216 may include any suitable memory or storage device such as random-access memory (RAM), static RAM (SRAM), dynamic RAM (DRAM), non-volatile RAM (NVRAM), read-only memory (ROM), or Flash memory useable to store device data 218 of the UE 110. The device data 218 includes user data, multimedia data, beamforming codebooks, applications, and/or an operating system of the UE 110, which are executable by processor(s) 214 to enable user-plane communication, control-plane signaling, and user interaction with the UE 110.

CRM 216 also includes a communication manager 220 (e.g., a communication manager application 220). Alternately or additionally, the communication manager 220 may be implemented in whole or part as hardware logic or circuitry integrated with or separate from other components of the UE 110. In at least some aspects, the communication manager 220 configures the RF front end 204, the LTE transceiver 206, the 5G NR transceiver 208, and/or the local wireless network transceiver 210 to implement the techniques described herein for UE-coordination-set control aggregation.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, and/or one or more 5G NR transceivers 258 for communicating with the UE 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency band defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with any UE 110 in a UE-coordination set.

The base stations 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base stations 120. The device data 264 includes network scheduling data, radio resource management data, beamforming codebooks, applications, and/or an operating system of the base stations 120, which are executable by processor(s) 260 to enable communication with the UE 110.

CRM 262 also includes a base station manager 266 (e.g., base station manager application 266). Alternately or additionally, the base station manager 266 may be implemented in whole or part as hardware logic or circuitry integrated with or separate from other components of the base stations 120. In at least some aspects, the base station manager 266 configures the LTE transceivers 256 and the 5G NR transceivers 258 for communication with the UE 110, as well as communication with a core network. The base stations 120 include an inter-base station interface 268, such as an Xn and/or X2 interface, which the base station manager 266 configures to exchange user-plane and control-plane data between another base station 120, to manage the communication of the base stations 120 with the UE 110. The base stations 120 include a core network interface 270 that the base station manager 266 configures to exchange user-plane and control-plane data with core network functions and entities.

Network Stack

Figure 3:
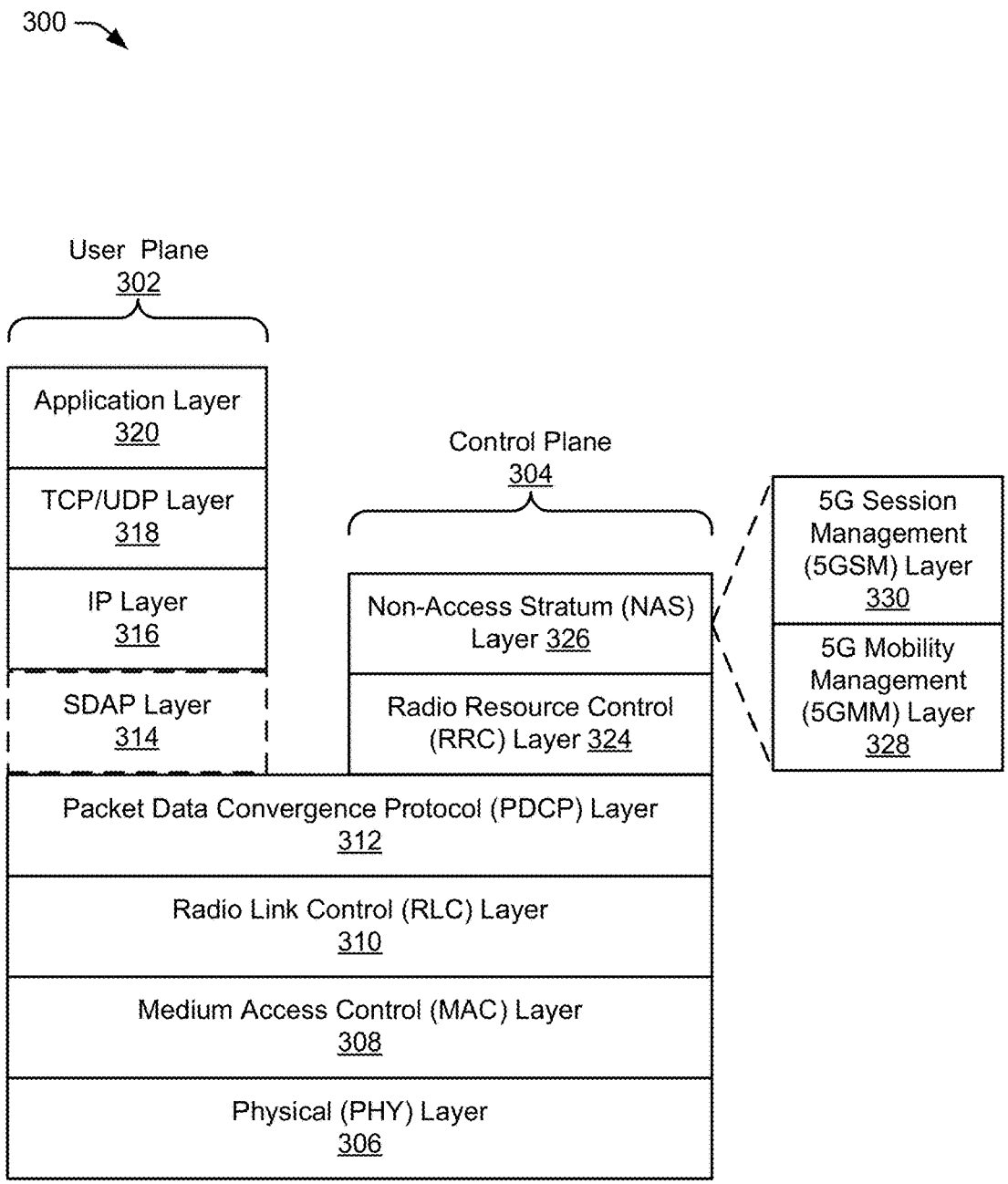
FIG. 3 illustrates an example block diagram of a wireless network stack model in which various aspects of user-equipment-coordination-set control aggregation can be implemented.

FIG. 3 illustrates an example block diagram 300 of a wireless network stack model 300 (stack 300). The stack 300 characterizes a communication system for the example environment 100, in which various aspects of user-equipment-coordination-set control aggregation can be implemented. The stack 300 includes a user plane 302 and a control plane 304. Upper layers of the user plane 302 and the control plane 304 share common lower layers in the stack 300. Wireless devices, such as the UE 110 or the base station 120, implement each layer as an entity for communication with another device using the protocols defined for the layer. For example, a UE 110 uses a Packet Data Convergence Protocol (PDCP) entity to communicate to a peer PDCP entity in a base station 120 using the PDCP.

The shared lower layers include a physical (PHY) layer 306, a Medium Access Control (or Media Access Control) (MAC) layer 308, a Radio Link Control (RLC) layer 310, and a PDCP layer 312. The PHY layer 306 provides hardware specifications for devices that communicate with each other. As such, the PHY layer 306 establishes how devices connect to each other, assists in managing how communication resources are shared among devices, and the like.

The MAC layer 308 specifies how data is transferred between devices. Generally, the MAC layer 308 provides a way in which data packets being transmitted are encoded and decoded into bits as part of a transmission protocol.

The RLC layer 310 provides data transfer services to higher layers in the stack 300. Generally, the RLC layer 310 provides error correction, packet segmentation and reassembly, and management of data transfers in various modes, such as acknowledged, unacknowledged, or transparent modes.

The PDCP layer 312 provides data transfer services to higher layers in the stack 300. Generally, the PDCP layer 312 provides transfer of user plane 302 and control plane 304 data, header compression, ciphering, and integrity protection.

Above the PDCP layer 312, the stack splits into the user-plane 302 and the control-plane 304. Layers of the user plane 302 include an optional Service Data Adaptation Protocol (SDAP) layer 314, an Internet Protocol (IP) layer 316, a Transmission Control Protocol/User Datagram Protocol (TCP/UDP) layer 318, and an application layer 320, which transfers data using the wireless link 106. The optional SDAP layer 314 is present in 5G NR networks. The SDAP layer 314 maps a Quality of Service (QoS) flow for each data radio bearer and marks QoS flow identifiers in uplink and downlink data packets for each packet data session. The IP layer 316 specifies how the data from the application layer 320 is transferred to a destination node. The TCP/UDP layer 318 is used to verify that data packets intended to be transferred to the destination node reached the destination node, using either TCP or UDP for data transfers by the application layer 320. In some implementations, the user plane 302 may also include a data services layer (not shown) that provides data transport services to transport application data, such as IP packets including web browsing content, video content, image content, audio content, or social media content.

The control plane 304 includes a Radio Resource Control (RRC) layer 324 and a Non-Access Stratum (NAS) layer 326. The RRC layer 324 establishes and releases connections and radio bearers, broadcasts system information, or performs power control. The RRC layer 324 also controls a resource control state of the UE 110 and causes the UE 110 to perform operations according to the resource control state. Example resource control states include a connected state (e.g., an RRC connected state) or a disconnected state, such as an inactive state (e.g., an RRC inactive state) or an idle state (e.g., an RRC idle state). In general, if the UE 110 is in the connected state, the connection with the base station 120 is active. In the inactive state, the connection with the base station 120 is suspended. If the UE 110 is in the idle state, the connection with the base station 120 is released. Generally, the RRC layer 324 supports 3GPP access but does not support non-3GPP access (e.g., WLAN communications).

The NAS layer 326 provides support for mobility management (e.g., using a Fifth-Generation Mobility Management (5GMM) layer 328) and packet data bearer contexts (e.g., using a Fifth-Generation Session Management (5GSM) layer 330) between the UE 110 and entities or functions in the core network, such as the Access and Mobility Management Function 152 (AMF 152) of the 5GC 150 or the like. The NAS layer 326 supports both 3GPP access and non-3GPP access.

In the UE 110, each layer in both the user plane 302 and the control plane 304 of the stack 300 interacts with a corresponding peer layer or entity in the base station 120, a core network entity or function, and/or a remote service, to support user applications and control operation of the UE 110 in the RAN 140.

UE-Coordination Set

Figure 4:
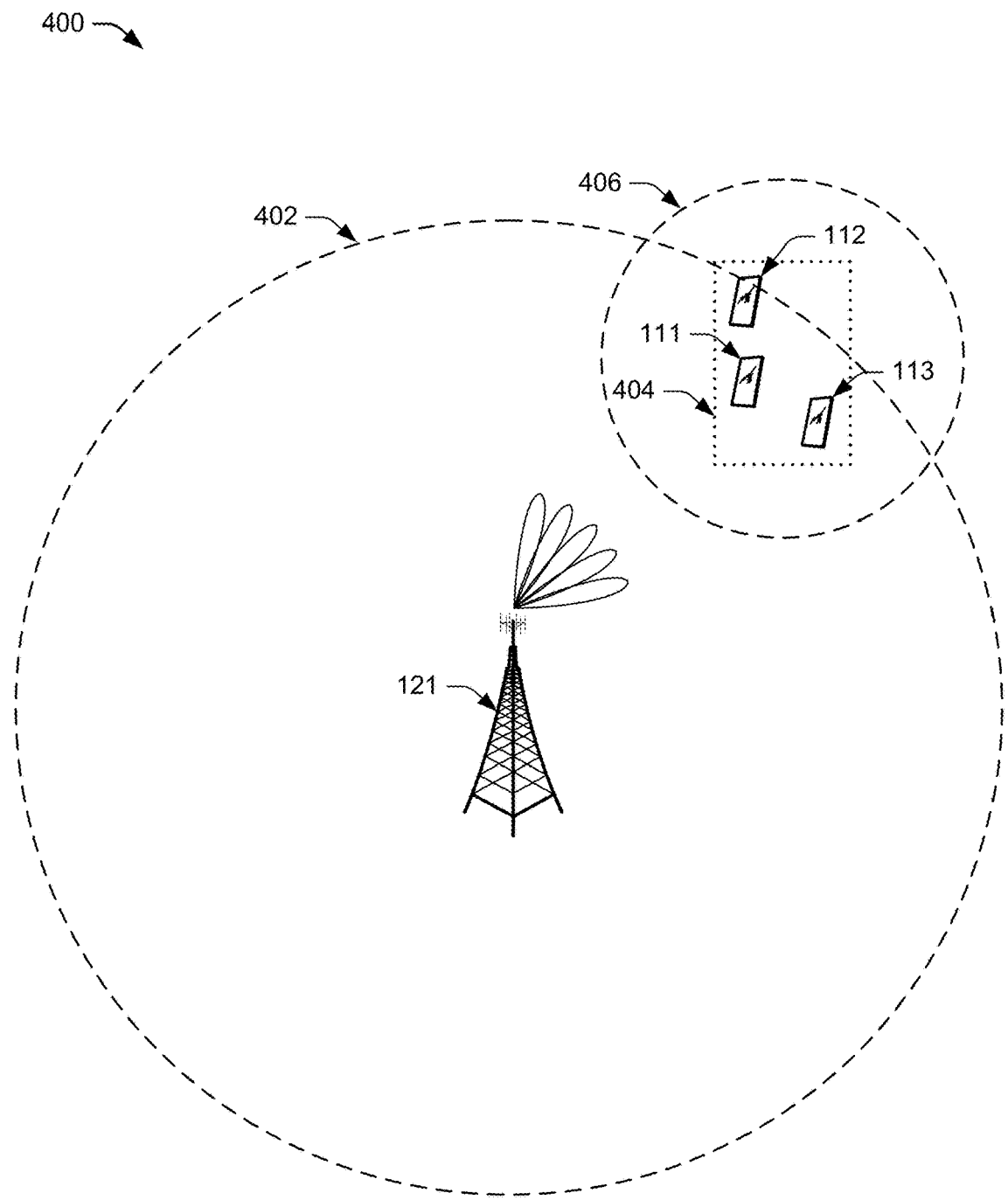
FIG. 4 illustrates an example environment in which various aspects of user-equipment-coordination-set control aggregation can be implemented.

FIG. 4 illustrates an example implementation 400 of user-equipment-coordination-set control aggregation. The illustrated example includes a base station 121, UE 111, UE 112, and UE 113. Although, for the sake of illustration clarity, the UECS in FIG. 4 is illustrated as including three UEs, any suitable number of UEs may be included in a UECS. In an example, each of the UEs illustrated in FIG. 4 has limited transmit power which may result in difficulty transmitting uplink data to the base station 121. This may be due, at least partially, to the UEs being proximate to a cell edge 402 of the cell provided by the base station 121 or the UEs being in a transmission-challenged location (e.g., a basement, urban canyon, etc.) resulting in a poor link budget between the base station 121 and the UEs. Each of the UEs illustrated in FIG. 4 may also, or alternatively, have limited receiver sensitivity, which may be affected by a poor link budget with the base station 121, as well as multipath reception, interference from in-band or out-of-band sources, attenuation from weather conditions or objects such as buildings, trees, etc.

Using the techniques described herein, the base station 121 can specify a set of UEs (e.g., the UE 111, UE 112, and UE 113) to form a UE-coordination set (e.g., the UE-coordination set 404) for joint transmission and joint reception of data for a target UE (e.g., the UE 112). The base station 121 may determine, based on information corresponding to the UEs (e.g., UE location, signal level, battery level, and so on), whether coordination is beneficial for a particular UE or not. Based on a user input or predefined setting, each of the UEs may opt in or out of participation in the UE-coordination set. An effective transmit power of the target UE 112 can increase significantly (e.g., linearly) with the number of UEs in the UE-coordination set, which can greatly improve a link budget of the target UE 112. The base station 121 may determine a UE-coordination set based on various factors, such as a location of each UE relative to the base station 121, distance between the UEs (such as between each other, between each UE and the target UE, or between each UE and a coordinating UE of the UE-coordination set) or a combination thereof. In some aspects, UEs within a certain distance of each other can more easily coordinate with one another to reduce signal interference when in close proximity by using a local wireless network.

In addition, UE coordination can be based on spatial beams or timing advance, or both, associated with each UE. For example, for beamforming or Massive-MIMO, it may be desirable that all the UEs within the UE-coordination set are able to receive the same signal from the base station. Therefore, all the UEs within the UE-coordination set may be geographically near one another, e.g., within a threshold distance of a particular UE in the UE-coordination set. In this way, the UEs in the UE-coordination set may each be in the same beam or beams that are close to each other. Timing advance may indicate a distance between a UE and the base station. A similar timing advance for each UE in a group indicates that those UEs are approximately the same distance from the base station. UEs within a predefined distance of one another that are all a similar distance from the base station may be capable of working together in a UE-coordination set in a distributed fashion to improve a signal strength and quality to the benefit of a single UE in the UE-coordination set.

The base station can send layer-2 messages (e.g., Medium Access Control layer) and/or layer-3 (e.g., Service Data Adaptation Protocol layer) messages to UEs to direct or request those UEs to join the UE-coordination set. The base station can provide additional data to the UEs within the UE-coordination set to enable the UEs to communicate with at least the coordinating UE or the target UE. The additional data may include an identity of the coordinating UE and/or an identity of the target UE, security information, and/or local wireless network information.

The base station can receive a response message from a UE in the UE-coordination set acknowledging the request message. In some cases, the base station can receive a response message from at least two of the UEs acknowledging that a UE has joined the UE-coordination set. The response message may indicate that the request message has been approved by a user of the UE.

In addition, the base station can identify and command (or request) a specific UE within the UE-coordination set to act as a coordinating UE (e.g., master UE) for the UE-coordination set. For example, the base station 121 can transmit a configuration message (e.g., request message) to the specific UE to request that the specific UE act as the coordinating UE for the UE-coordination set. The specific UE may accept or decline the request based on user input from a user of the UE or a setting that is set to automatically accept or decline such requests. In some aspects, the UE may transmit a UE-capability message or other layer-3 message as a response to the request message from the base station 121. The coordinating UE can coordinate the messages and samples sent between UEs within the UE-coordination set for joint transmission and joint reception. In aspects, the coordinating UE can determine where the joint processing is to occur, e.g., at the coordinating UE or the target UE. In an example, the coordinating UE can coordinate how a particular UE in the UE-coordination set is to send I/Q samples, which the particular UE demodulates from signals received from the base station, to the target UE.

The base station can select the coordinating UE from the group of UEs in the UE-coordination set based on a variety of factors, some of which may be signaled to the base station by the UE using a UE-capability message. For example, one factor includes processing power of the coordinating UE, which provides the coordinating UE the capability to handle certain aspects of the UE-coordination set including central coordination or scheduling. Another factor may include a battery-level state of the coordinating UE. For instance, if a particular UE in the UE-coordination set has a low battery, then that UE may not be a good candidate to act as the coordinating UE. Accordingly, UEs within the UE-coordination set that have a battery-level state above a threshold value may be considered as candidates for selection as the coordinating UE. In one example, the base station may first select one UE as a coordinating UE, and receive, subsequent to formation of the UE-coordination set, messages from the other UEs in the UE-coordination set indicating respective battery-level states. Then, the base station can change the coordination UE if another UE in the UE-coordination set would be a better candidate based on the battery-level states of the UEs in the UE-coordination set.

Yet another factor may include a location of the coordinating UE. The base station may identify the location of the UEs in the UE-coordination set based on various factors, such as angle of arrival of signals from the UE, timing advance, observed time difference of arrival (OTDOA), and so on. An ideal location for the coordinating UE may be geographically central in the UE-coordination set as this may maximize the coordinating UE's capability to coordinate and communicate with the other UEs in the UE-coordination set. However, the coordinating UE is not required to be in a central location of the UEs in the UE-coordination set. Rather, the coordinating UE can be located at any location within the UE-coordination set that allows the coordinating UE to communicate and coordinate with the other UEs in the UE-coordination set. The base station constantly monitors the UE-coordination set and can update the coordinating UE at any time based on updated factors, such as updated UE locations, UE battery-level state, and so on. Or, as mentioned previously, the coordinating UE may transfer its joint processing responsibilities to another UE based on factors such as processing power, battery level, and/or geographic location.

In some aspects, the base station can receive indications from one or more UEs in the UE-coordination set that advertise their capability to act as the coordinating UE. Additionally or alternatively, the base station can receive indications from one or more UEs in the UE-coordination set that indicate a willingness of a user of a respective UE to allow their UE to participate in the UE-coordination set and/or act as the coordinating UE. Accordingly, a UE in the UE-coordination set can indicate, using a layer-3 message, to the base station whether it is capable of acting and/or is permitted to act as the coordinating UE.

In the illustrated example 400 in FIG. 4, the base station 121 may select UE 111 to act as the coordinating UE since the UE 111 is located between UE 112 and UE 113 or because the UE 111 is capable of communicating with each of the other UEs 112 and 113 in the UE-coordination set. The base station 121 may select the coordinating UE for various reasons, examples of which are described above. Being at the cell edge, all three of the UEs 111, 112, 113 have weak cellular signal reception. The base station 121 selects UE 111 to coordinate messages and samples sent between the base station 121 and the UEs 111, 112, 113 for the target UE 112. Communication among the UEs can occur using a local wireless network 406, such as a PAN, NFC, Bluetooth, WiFi-Direct, local mmWave link, etc. In this example, all three of the UEs 111, 112, 113 receive RF signals from the base station 121. The UE 111, UE 112, and UE 113 demodulate the RF signals to produce baseband I/Q analog signals, and sample the baseband I/Q analog signals to produce I/Q samples. The UE 112 and the UE 113 forward the I/Q samples along with system timing information (e.g., system frame number (0)) using the local wireless network 406 to the coordinating UE 111 using the local wireless network transceiver 210. The coordinating UE 111 then uses the timing information to synchronize and combine the I/Q samples and processes the combined signal to decode data packets for the target UE 112. The coordinating UE 111 then transmits the data packets to the target UE 112 using the local wireless network 406.

When the target UE 112 has uplink data to send to the base station 121, the target UE transmits the uplink data to the coordinating UE 111 that uses the local wireless network 406 to distribute the uplink data, as I/Q samples, to each UE in the UE-coordination set 404. Each UE in the UE-coordination set 404 synchronizes with the base station 121 for timing information and its data transmission resource assignment. Then, all three UEs in the UE-coordination set 404 jointly transmit the uplink data to the base station 121. The base station 121 receives the jointly transmitted uplink data from the UEs 111, 112, 113 and processes the combined signal to decode the uplink data from the target UE 112.

UE-Coordination-Set Control Aggregation

Figure 5:
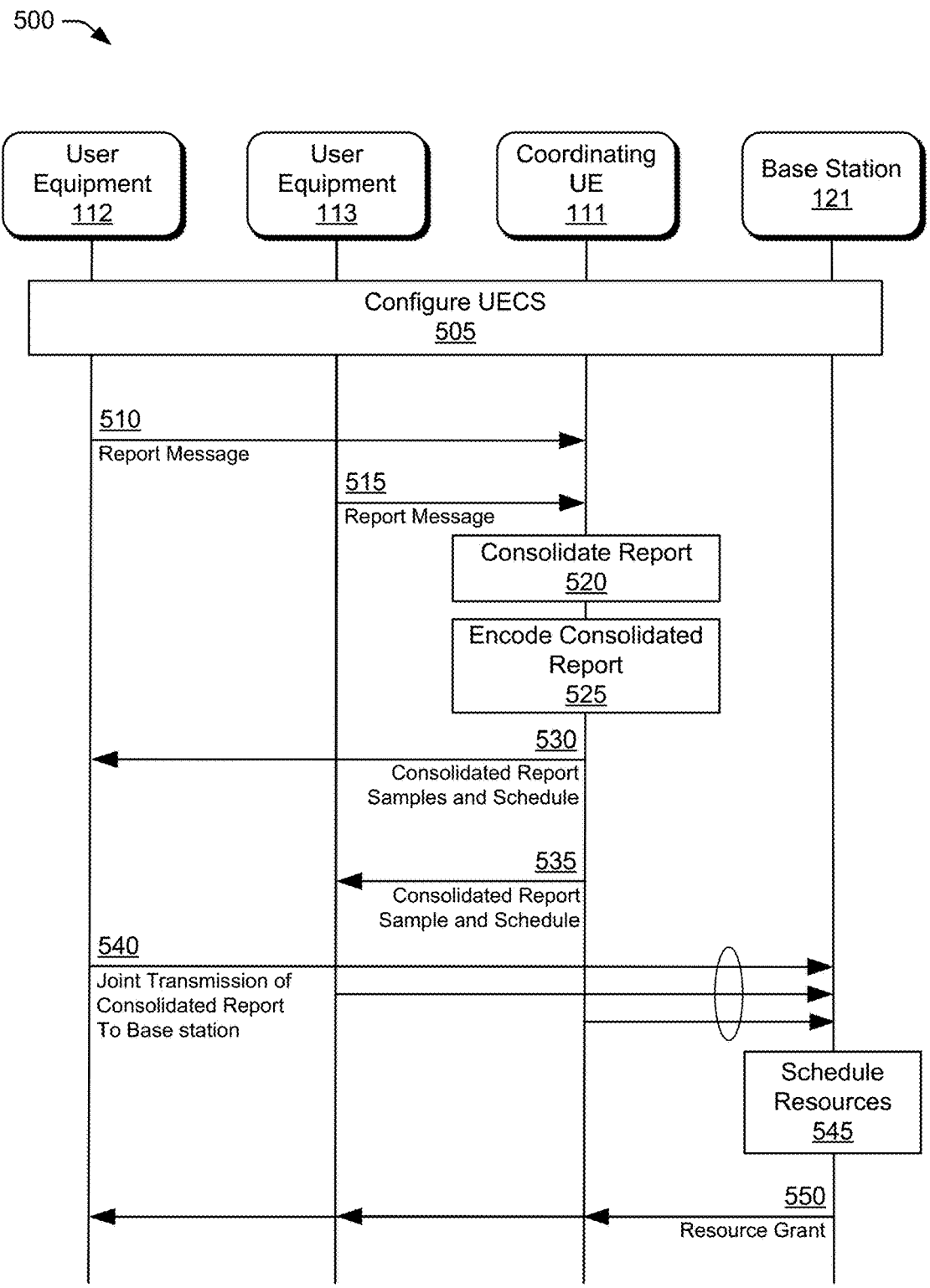
FIG. 5 illustrates example data and control transactions between devices of a user-equipment-coordination set and a base station for consolidated reporting from the user-equipment-coordination set in accordance with aspects of user-equipment-coordination-set control aggregation.

FIG. 5 illustrates data and control transactions between devices of a user-equipment-coordination set and a base station for consolidated reporting from a user-equipment-coordination set in accordance with aspects of user-equipment-coordination-set control aggregation. Although not illustrated for the sake of illustration clarity, various acknowledgements for messages illustrated in FIG. 5 may be implemented to ensure reliable operations of UECS control aggregation.

At 505 and as described above with respect to FIG. 4, the base station 121 configures a UECS (e.g., the UECS 404) including the UE 111, the UE 112, and the UE 113. The base station 121 configures the UE 111 as the coordinating UE for the UECS. Although, for the sake of illustration clarity, the UECS in FIG. 5 is illustrated as including three UEs, any suitable number of UEs may be included in the UECS.

At 510, the UE 112 sends a report message to the coordinating UE 111 using the local wireless network, and at 515 the UE 113 sends a report message to the coordinating UE 111 using the local wireless network. Each report message includes a report value for a parameter to be reported to the base station. In aspects, the report message is a MAC layer 308 report message. In a first example, the report messages are Buffer Status Report messages that indicate the amount of data each UE is buffering (e.g., the report value is a buffer size value of the UE) for uplink transmission. In a second example, the report messages are Power Headroom Report messages that indicate a report value that is the value of the transmit power headroom each UE has above its current transmit power.

At 520, the coordinating UE 111 consolidates the reports received from the other UEs in the UECS with its own report value to generate a consolidated report message to transmit to the base station 121. Returning to the first example, the coordinating UE 111 consolidates the BSRs from other UEs in the UECS with its own BSR buffer size value to generate a consolidated BSR that includes user equipment identities (UEIDs) for the UEs in the UECS and respective BSR buffer size values for those UEs for joint transmission to the base station. In one alternative the consolidated BSR includes a table of user equipment identities (UEIDs) for the UEs in the UECS and respective BSR buffer size values for those UEs.

In alternatives, the consolidated BSR buffer size values can be reported in any suitable manner, such as reporting the BSR buffer size value of the coordinating UE and difference (delta) values of the BSR buffer size values of the other UEs relative to the BSR buffer size value of the coordinating UE. In another alternative, the coordinating UE reports a statistical or mathematical function of the set of the BSR buffer size values of the UEs in the UECS (e.g., a median value, a mode value, a maximum value, a summation of the values, or the like). The report of the statistical or mathematical function of the set of the BSR buffer size values can include, or not include, the difference (delta) values of the BSR buffer size values of the UEs in the UECS relative to the value of the mathematical or statistical function of the set of BSR buffer size values.

Returning to the second example, the coordinating UE 111 consolidates the Power Headroom Reports (PHRs) from other UEs in the UECS with its own PHR transmit power headroom value to generate a consolidated PHR that includes user equipment identities (UEIDs) for the UEs in the UECS and respective PHR transmit power headroom values for those UEs for joint transmission to the base station. In one alternative the consolidated PHR transmit power headroom values include a table of user equipment identities (UEIDs) for the UEs in the UECS and respective PHR transmit power headroom values for those UEs.

In alternatives, the consolidated PHR transmit power headroom values can be reported in any suitable manner, such as reporting the PHR transmit power headroom value of the coordinating UE and difference (delta) values of the PHR transmit power headroom values of the other UEs relative to the PHR transmit power headroom value of the coordinating UE. In another alternative, the coordinating UE reports a statistical or mathematical function of the set of the PHR transmit power headroom values of the UEs in the UECS (e.g., a median value, a mode value, a maximum value, a summation of the values, or the like). The report of the statistical or mathematical function of the set of the PHR transmit power headroom values can include, or not include, the difference (delta) values of the PHR transmit power headroom values of the UEs in the UECS relative to the value of the mathematical or statistical function of the set of PHR transmit power headroom values.

At 525, the coordinating UE 111 encodes the consolidated report message to generate I/Q samples for joint transmission of the consolidated report message to the base station 121. At 530 and 535, the coordinating UE 111 sends the generated I/Q samples to the other UEs (112, 113) in the UECS 404 using the local wireless network 406. At 540, the UEs (111, 112, and 113) in the UECS jointly transmit the consolidated report to the base station 121.

At 545, after receiving the consolidated report, the base station 121 may determine to schedule resources for uplink transmissions by the UECS, and at 550 transmits a resource grant to the UEs (111, 112, and 113) in the UECS 404. In the first example, based on receiving the consolidated BSR report, the base station 121 determines that air interface resources are required for uplink transmission of the pending data buffered at the UEs in the UECS and transmits a resource grant for transmission of the buffered data. In the second example, the base station 121 determines that UEs in the UECS can transmit with a higher throughput, allocates resources for the higher throughput for uplink transmission, and transmits a resource grant for transmission of at the higher throughput.

Figure 6:
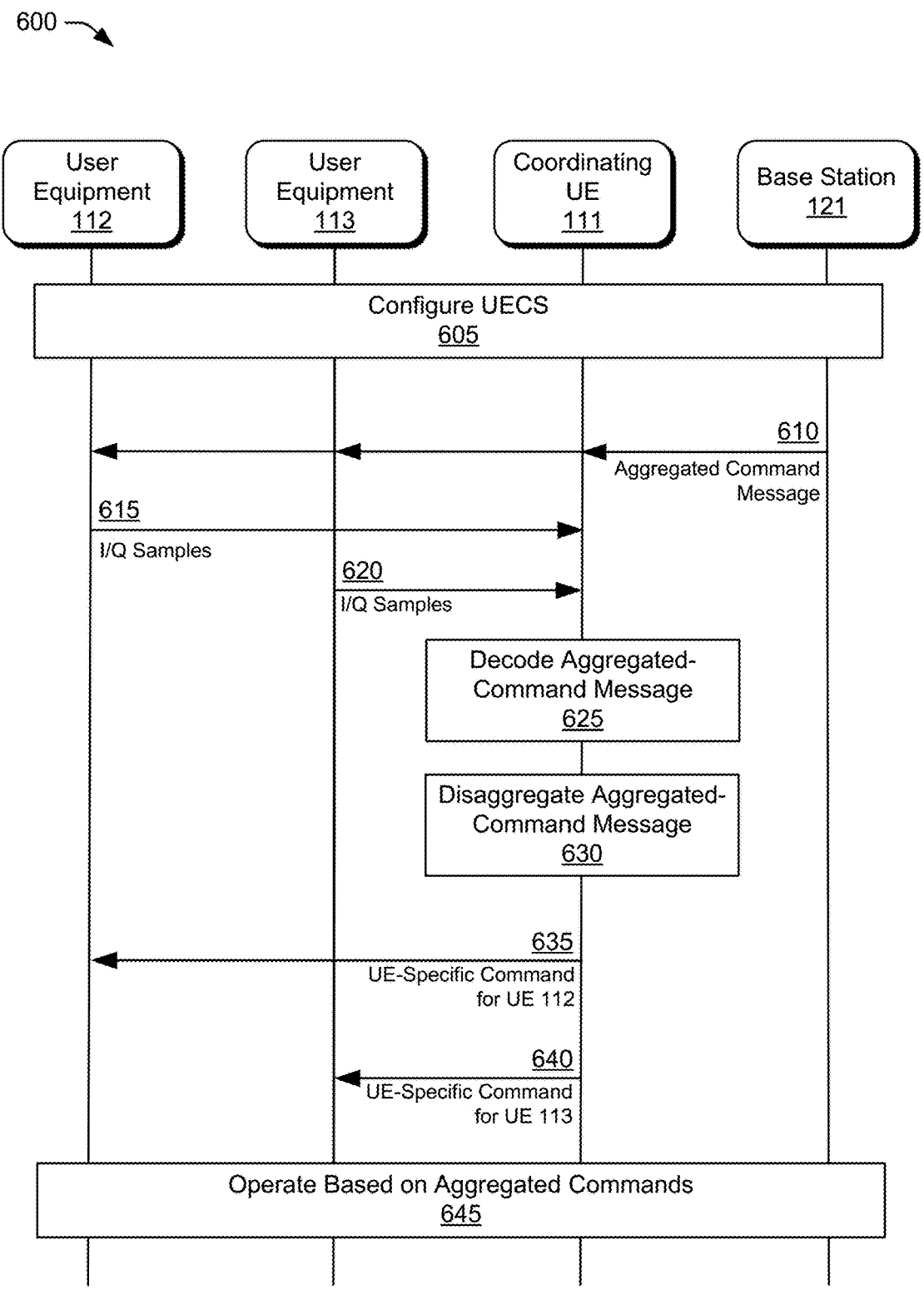
FIG. 6 illustrates additional example data and control transactions between devices of a user-equipment-coordination set and a base station for aggregated command transmission to the user-equipment-coordination set in accordance with aspects of user-equipment-coordination-set control aggregation.

FIG. 6 illustrates data and control transactions between devices of a user-equipment-coordination set and a base station for aggregated command transmission to the user-equipment-coordination set in accordance with aspects of user-equipment-coordination-set control aggregation. Although not illustrated for the sake of illustration clarity, various acknowledgements for messages illustrated in FIG. 6 may be implemented to ensure reliable operations of UECS control aggregation.

At 605 and as described above with respect to FIG. 4, the base station 121 configures a UECS (e.g., the UECS 404) including the UE 111, the UE 112, and the UE 113. The base station 121 configures the UE 111 as the coordinating UE for the UECS. Although, for the sake of illustration clarity, the UECS in FIG. 6 is illustrated as including three UEs, any suitable number of UEs may be included in the UECS.

At 610, the base station 121 transmits an aggregated-command message that includes an aggregation of commands for the individual UEs in the UECS. The aggregated-command message includes user equipment identities (UEIDs) for the UEs in the UECS and respective command values for those UEs. The UEs 111, 112, and 113 in the UECS 404 receive downlink transmission of the aggregated-command message, and demodulate and sample the downlink transmission. In aspects, the aggregated-command message is an aggregation of MAC layer 308 commands. Generally, the aggregated-command message values can be reported in any suitable manner. In one embodiment, a command value for the coordinating UE and difference (delta) command values for the other UEs may be send (the command values for the other UEs thus being deltas from the command value for the coordinating UE).

In a first example, the aggregated-command message is an aggregation of transmit power control (TPC) messages for the individual UEs in the UECS. In one alternative the aggregated-command message includes a table of user equipment identities (UEIDs) for the UEs in the UECS and respective power control values for those UEs. In an alternative, the aggregated-command message values can be reported in any other suitable manner, such as sending a power control value for the coordinating UE and difference (delta) power control values for the other UEs from the power control value for the coordinating UE.

In a second example, the aggregated-command message is an aggregation of timing advance (TA) messages for the individual UEs in the UECS. In one alternative, the aggregated-command message includes a table of user equipment identities (UEIDs) for the UEs in the UECS and respective timing advance values for those UEs. In an alternative, the aggregated-command message values can be sent as a timing advance value for the coordinating UE and difference (delta) timing advance values for the other UEs from the timing advance value for the coordinating UE.

The UEs in the UECS receive the downlink transmission of the aggregated-command message. The UEs demodulate and sample the received downlink transmission signal. At 615 and 620, the UEs 112 and 113 forward the I/Q samples, using the local wireless network 406, to the coordinating UE 111. At 625, the coordinating UE combines the I/Q samples from the UE 112 and the UE 113 with its own I/Q samples for the demodulated aggregated-command message to decode the aggregated-command message.

At 630, the coordinating UE 111 disaggregates the aggregated-command message to extract commands for individual UEs and generates UE-specific command messages for the UEs in the UECS. The coordinating UE 111 sends the UE-specific command messages to the UE 112 at 635 and the UE 113 at 640. In the first example, the UE-specific command messages are UE-specific transmit power control messages. In the second example, the UE-specific command messages are UE-specific timing advance messages. In one alternative, in circumstances in which the UEs in the UECS are in close proximity or share similar uplink and/or downlink radio conditions, a command setting (e.g., a transmit power control setting or a timing advance setting) may be the same for (common to) all the UEs in the UECS. In this alternative, the aggregated-command message at 610 indicates that the command is common to all the UEs in the UECS, and at 630, the coordinating UE 113 generates UE-specific commands from the common command.

At 645, the UEs in the UECS are operating using the values in the aggregated-command message. In the first example, the UEs in the UECS each transmit uplink data based on the received transmit power control command. In the second example, the UEs in the UECS each operate based on the received timing advance command.

Example Methods

Example methods 700 and 800 are described with reference to FIGS. 7 and 8 in accordance with one or more aspects of user-equipment-coordination-set control aggregation. The order in which the method blocks are described are not intended to be construed as a limitation, and any number of the described method blocks can be skipped, repeated, or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 7:
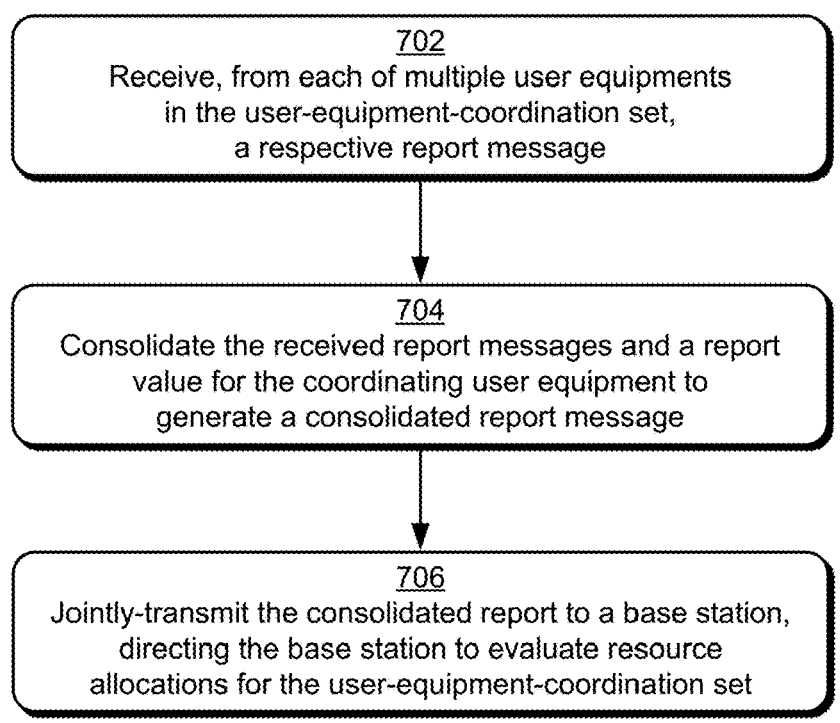
FIG. 7 illustrates an example method of user-equipment-coordination-set control aggregation as generally related to the coordinating user equipment in accordance with aspects of the techniques described herein.

FIG. 7 illustrates example method(s) 700 of user-equipment-coordination-set control aggregation as generally related to a coordinating user equipment. At 702, a coordinating user equipment receives, from each of multiple user equipments in the user-equipment-coordination set, a respective report message. For example, a coordinating user equipment (e.g., the coordinating UE 111) receives, from each of multiple user equipments (e.g., UE 112, UE 113) in the user-equipment-coordination set (e.g., the UECS 404), a respective report message. The report message may be a Medium Access Control layer (e.g., the MAC layer 308) report such as a Buffer Status Report (BSR) or a Power Headroom Report (PHR).

At 704, the coordinating user equipment consolidates the received report messages and a report value for the coordinating user equipment to generate a consolidated report message. For example, the coordinating user equipment 111 consolidates the received report messages and the report value for the coordinating user equipment 111 to generate a consolidated report message. The report value of the coordinating UE 111 is a value included in the same type of report message received from the other UEs 112 and 113 in the UECS 404, such as a report value included the MAC layer report (e.g., a buffer size value of a BSR or a transmit power headroom value of a PHR report).

At 706, the coordinating user equipment jointly transmits the consolidated report to a base station, directing the base station to evaluate resource allocations for the user-equipment-coordination set. For example, the coordinating UE 111 jointly transmits the consolidated report (at 540) to a base station (e.g., the base station 121). The joint-transmission can include the coordinating UE 111 processing the generated, consolidated report message to produce I/Q samples for the joint-transmission and forwarding the I/Q samples (at 530 and 535), using a local wireless network (e.g., the local wireless network 406) to the multiple user equipments 112, 113 to jointly transmit the consolidated report message.

Figure 8:
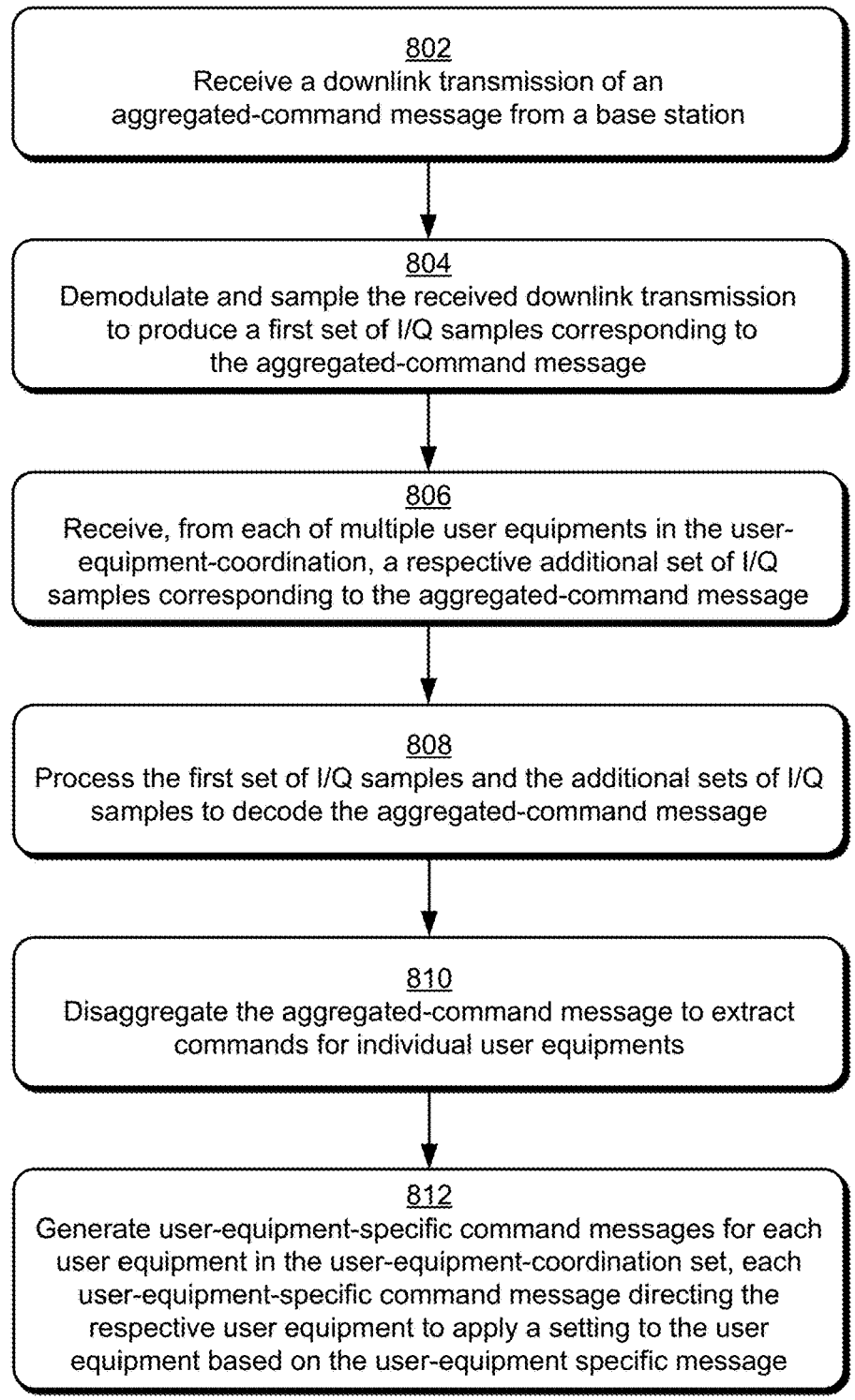
FIG. 8 illustrates an example method of user-equipment-coordination-set control aggregation as generally related to the coordinating user equipment in accordance with aspects of the techniques described herein.

FIG. 8 illustrates example method(s) 800 of user-equipment-coordination-set control aggregation as generally related to a coordinating user equipment. At 802, a coordinating user equipment receives a downlink transmission of an aggregated-command message from a base station. For example, a coordinating user equipment (e.g., the coordinating UE 111) receives, from a base station (e.g., the base station 121), a downlink transmission of an aggregated-command message (610). The aggregated command message may be a Medium Access Control layer (e.g., the MAC layer 308) command such as a transmit power control command or a timing advance command.

At 804, the coordinating user equipment demodulates and samples the received downlink transmission to produce a first set of I/Q samples corresponding to the aggregated-command message. For example, the coordinating UE 111 demodulates and samples the downlink transmission to produce a set of I/Q samples corresponding to the aggregated-command message.

At 806, the coordinating user equipment receives, from each of multiple user equipments in the user-equipment-coordination, a respective additional set of I/Q samples corresponding to the aggregated-command message. For example, the coordinating UE 111 receives I/Q samples from the UE 112 (at 615) and the UE 113 (at 620) using a local wireless network (e.g., the local wireless network 406).

At 808, the coordinating user equipment processes the first set of I/Q samples and the additional sets of I/Q samples to decode the aggregated-command message. For example, the coordinating UE 111 processes the first set of I/Q samples and the additional sets of I/Q samples to decode (at 625) the aggregated command message.

At 810, the coordinating user equipment disaggregates the aggregated-command message to extract commands for individual user equipments. For example, the coordinating UE 111 identifies portions of the aggregated-command message that include commands associated with user equipment identifiers for the UEs (111, 112, and 113) in the UECS (e.g., the UECS 404).

At 812, the coordinating user equipment generates user-equipment-specific command messages for each user equipment in the user-equipment-coordination set from the extracted commands, each user-equipment-specific command message directing the respective user equipment to apply a setting to the user equipment based on the user-equipment specific message. For example, the coordinating UE 111 generates user-specific commands for each UE (UE 111, UE 112, and UE 113) in the UECS 404. Each user-equipment-specific command message directs the respective user equipment to apply a setting to the user equipment based on the user-equipment specific message, such as a Medium Access Control layer (e.g., the MAC layer 308) command setting such as a transmit power control setting or a timing advance setting.

In the following some examples are described—

Example 1: A method for report consolidation by a user equipment configured as a coordinating user equipment for a user-equipment-coordination set in a wireless communications network, the method comprising the coordinating user equipment:

receiving from each of multiple user equipments in the user-equipment-coordination set a respective report message;

consolidating the received report messages and a report value of the coordinating user equipment to generate a consolidated report message; and transmitting the consolidated report message to a base station, directing the base station to evaluate resource allocations for the user-equipment-coordination set based on the consolidated report message.

Example 2: The method of example 1, wherein the consolidated report message includes a Medium Access Control layer report value for each of multiple UEs and the coordinating user equipment.

Example 3: The method of example 2, wherein the Medium Access Control layer report value is a buffer status report buffer size value.

Example 4: The method of example 2, wherein the Medium Access Control layer report value is a power headroom report transmit power headroom value.

Example 5: The method of any one of examples 1 to 4, the method comprising jointly transmitting the consolidated report message to the base station via the multiple user equipments of the user-equipment-coordination set.

Example 6: The method of example 5, comprising the coordinating user equipment:

encoding the generated, consolidated report message to produce I/Q samples for a joint-transmission of the consolidated report message to the base station; and forwarding the I/Q samples to the multiple user equipments for directing the multiple user equipments to jointly transmit the encoded consolidated report message.

Example 7: The method of any one of examples 1 to 6, wherein the receiving the report messages comprises the coordinating user equipment:

receiving the report messages using a local wireless network.

Example 8: The method of any one of examples 1 to 7, wherein the consolidated report message includes a respective user equipment identifier for each of the multiple user equipments and the coordinating user equipment, and wherein the user equipment identifier for each of the multiple user equipments and the coordinating user equipment are associated with respective report values.

Example 9: The method of example 8, wherein the consolidated report message comprises a table including user equipment identifiers for each of the multiple user equipments and the associated respective report values.

Example 10: The method of any one of examples 1 to 9, comprising the coordinating user equipment:

generating a statistical value based on a report value in each of the received report messages and the report value of the coordinating user equipment;

inserting the statistical value in the consolidated report message;

calculating a difference between the statistical value and each of the report values; and inserting user equipment identifier for each of the multiple user equipments and the coordinating user equipment and a difference value for each of the multiple user equipments and the coordinating user equipment in the consolidated report message.

Example 11: The method of example 10, wherein the statistical value is a median of the report values, a mode of the report values, or a maximum of the report values.

Example 12: The method of any one of examples 1 to 9, comprising the coordinating user equipment:

inserting the report value for the coordinating user equipment in the consolidated report message;

calculating a difference between the report value for the coordinating user equipment and each of the report values; and inserting the difference value for each of the multiple user equipments in the consolidated report message.

Example 13: The method of any one of examples 1 to 12, further comprising the coordinating user equipment:

in response to the jointly transmitting the consolidated report, receiving a resource grant from the base station.

Example 14: A method for command aggregation by a user equipment configured as a coordinating user equipment for a user-equipment-coordination set in a wireless communications network, the method comprising the coordinating user equipment:

receiving a downlink transmission of an aggregated-command message from a base station;

demodulating and sampling the received downlink transmission to produce a first set of I/Q samples corresponding to the aggregated-command message;

receiving from each of multiple user equipments in the user-equipment-coordination set a respective additional set of I/Q samples corresponding to the aggregated-command message;

processing the first set of I/Q samples and the additional sets of I/Q samples to decode the aggregated-command message;

disaggregating the decoded aggregated-command message to extract commands for individual user equipments; and generating user-equipment-specific command messages for each user equipment in the user-equipment-coordination set from the extracted commands, each user-equipment-specific command message directing the respective user equipment to apply a setting to the user equipment based on the user-equipment specific message.

Example 15: The method of example 14, further comprising the coordinating user equipment:

forwarding a user-equipment-specific command message to each of the multiple user equipments; and passing the user-equipment specific command for the coordinating user equipment to a network stack of the coordinating user equipment.

Example 16: The method of example 14 or 15, wherein the command message for the coordinating user equipment includes a first command value and each command message for the other user equipments of the user-equipment-coordination set includes a difference command value from the first command value.

Example 17: The method of example 16, wherein the difference command values are set individually for each user equipment.

Example 18. The method of example 14 to example 17, wherein the user-equipment-specific command messages are Medium Access Control layer command messages.

Example 19: The method of any one of examples 14 to 18, wherein the Medium Access Control command is a transmit power control command.

Example 20: The method of example 19, wherein the power control command includes a same transmit power control value for each of the user equipments in the user-equipment-coordination set.

Example 21: The method of example 19, wherein the power control command includes a different transmit power control value for at least one user equipment than the other user equipments in the user-equipment-coordination set.

Example 22: The method of any one of examples 14 to 18, wherein the Medium Access Control layer command is a timing advance command.

Example 23: The method of example 22, wherein the timing advance command includes a same timing advance value for each of the user equipments in the user-equipment-coordination set.

Example 24: The method of example 22, wherein the timing advance command includes a different timing advance value for at least one user equipment than the other user equipments in the user-equipment-coordination set.

Example 25: The method of any one of examples 14 to 24, wherein the forwarding the user-equipment-specific command message to each of the multiple user equipments comprises the coordinating user equipment:

forwarding the user-equipment specific command using a local wireless network.

Example 26: A user equipment comprising:
a wireless transceiver;
a local wireless network transceiver;
a processor; and
instructions for a communication manager application that are executable by the processor to configure the user equipment to perform any one of examples 1 to 25.

Although aspects of user-equipment-coordination-set control aggregation have been described in language specific to features and/or methods, the subject of the appended claims is not necessarily limited to the specific features or methods described. Rather, the specific features and methods are disclosed as example implementations of user-equipment-coordination-set control aggregation, and other equivalent features and methods are intended to be within the scope of the appended claims. Further, various different aspects are described, and it is to be appreciated that each described aspect can be implemented independently or in connection with one or more other described aspects.

The invention claimed is:

1. A method for user-equipment-coordination set control aggregation by a user equipment configured as a coordinating user equipment for a user-equipment-coordination set in a wireless communications network, the method comprising the coordinating user equipment:
receiving, from each of multiple user equipments in the user-equipment-coordination set, a respective report message, each respective report message including a report value for a parameter to be reported to a base station;
consolidating the report value from each respective report message of the multiple user equipments and the coordinating user equipment to generate a consolidated report message; and
jointly transmitting the consolidated report message to a base station via the multiple user equipments of the user-equipment-coordination set.

2. The method of claim 1, wherein the consolidated report message includes a Medium Access Control layer report value for each of multiple UEs and the coordinating user equipment.

3. The method of claim 2, wherein the Medium Access Control layer report value is a buffer status report buffer size value.

4. The method of claim 2, wherein the Medium Access Control layer report value is a power headroom report transmit power headroom value.

5. The method of claim 1, wherein the jointly transmitting comprises:
encoding the consolidated report message to produce I/Q samples for a joint-transmission of the consolidated report message to the base station; and
forwarding the I/Q samples to the multiple user equipments for directing the multiple user equipments to jointly transmit the encoded consolidated report message.

6. The method of claim 1, wherein the receiving the report messages comprises the coordinating user equipment:
receiving the report messages using a local wireless network.

7. The method of claim 1, wherein the consolidated report message includes a respective user equipment identifier for each of the multiple user equipments and the coordinating user equipment, and wherein the user equipment identifier for each of the multiple user equipments and the coordinating user equipment are associated with respective report values.

8. The method of claim 1, further comprising the coordinating user equipment:
in response to the jointly transmitting the consolidated report message, receiving a resource grant from the base station.

9. A method for user-equipment-coordination set control aggregation by a user equipment configured as a coordinating user equipment for a user-equipment-coordination set in a wireless communications network, the method comprising the coordinating user equipment:
receiving a downlink transmission of an aggregated-command message from a base station;
demodulating and sampling the received downlink transmission to produce a first set of I/Q samples corresponding to the aggregated-command message;
receiving, from each of multiple user equipments in the user-equipment-coordination set, a respective additional set of I/Q samples corresponding to the aggregated-command message;
processing the first set of I/Q samples and the additional sets of I/Q samples to decode the aggregated-command message;
disaggregating the decoded aggregated-command message to extract commands for individual user equipments; and
generating user-equipment-specific command messages for each user equipment in the user-equipment-coordination set from the extracted commands, each user-equipment-specific command message directing the respective user equipment to apply a setting to the user equipment based on the user-equipment specific message.

10. The method of claim 9, further comprising the coordinating user equipment:
forwarding a user-equipment-specific command message to each of the multiple user equipments; and
passing the user-equipment specific command for the coordinating user equipment to a network stack of the coordinating user equipment.

11. The method of claim 9, wherein the user-equipment-specific command messages are Medium Access Control layer command messages.

12. The method of claim 11, wherein the Medium Access Control command is a transmit power control command.

13. The method of claim 11, wherein the Medium Access Control layer command is a timing advance command.

14. The method of claim 10, wherein the forwarding the user-equipment-specific command message to each of the multiple user equipments comprises the coordinating user equipment:
forwarding the user-equipment specific command using a local wireless network.

15. A user equipment comprising:
a wireless transceiver;
a local wireless network transceiver;
a processor; and
instructions for a communication manager application that are executable by the processor to configure the user equipment to:
receive, from each of multiple user equipments in a user-equipment-coordination set, a respective report message, each respective report message including a report value for a parameter to be reported to a base station;
consolidate the report value from each respective report message of the multiple user equipments and the user equipment to generate a consolidated report message; and
jointly transmit the consolidated report message to a base station via the multiple user equipments of the user-equipment-coordination set.

16. The user equipment of claim 15, wherein the consolidated report message includes a Medium Access Control layer report value for each of multiple UEs and the coordinating user equipment.

17. The user equipment of claim 16,
wherein the Medium Access Control layer report value is a buffer status report buffer size value; or wherein the Medium Access Control layer report value is a power headroom report transmit power headroom value.

18. The user equipment of claim 15, wherein the user equipment receives the report messages using a local wireless network.

19. The user equipment of claim 15, the instructions for the communication manager application further executable by the processor to configure the user equipment to:
  in response to the joint transmission of the consolidated report message, receive a resource grant from the base station.

20. A method for user-equipment-coordination set control aggregation by a user equipment configured as a coordinating user equipment for a user-equipment-coordination set in a wireless communications network, the method comprising the coordinating user equipment:
  receiving, from each of multiple user equipments in the user-equipment-coordination set, a respective report message, each respective report message including a report value for a parameter to be reported to a base station;
  consolidating the report value from each respective report message of the multiple user equipments and the coordinating user equipment to generate a consolidated report message; and
  jointly transmitting the consolidated report message to a base station, , the jointly transmitting comprising:
    encoding the consolidated report message to produce I/Q samples for a joint-transmission of the consolidated report message to the base station; and
    forwarding the I/Q samples to the multiple user equipments for directing the multiple user equipments to jointly transmit the encoded consolidated report message.

* * * * *